(12) United States Patent
McClure et al.

(10) Patent No.: US 8,018,376 B2
(45) Date of Patent: Sep. 13, 2011

(54) GNSS-BASED MOBILE COMMUNICATION SYSTEM AND METHOD

(75) Inventors: John A. McClure, Scottsdale, AZ (US); Dennis M. Collins, Fountain Hills, AZ (US); Aaron C. Stichter, Apache Junction, AZ (US); John T. E. Timm, San Jose, CA (US)

(73) Assignee: Hemisphere GPS LLC, Calgary (CA)

( * ) Notice: Subject to any disclaimer, the term of this patent is extended or adjusted under 35 U.S.C. 154(b) by 105 days.

(21) Appl. No.: 12/419,140

(22) Filed: Apr. 6, 2009

(65) Prior Publication Data

US 2009/0251366 A1      Oct. 8, 2009

Related U.S. Application Data

(60) Provisional application No. 61/043,224, filed on Apr. 8, 2008.

(51) Int. Cl.
*G01S 1/00* (2006.01)
(52) U.S. Cl. .................................. 342/350; 342/357.09
(58) Field of Classification Search .............. 342/357.09
See application file for complete search history.

(56) References Cited

U.S. PATENT DOCUMENTS

| | | | |
|---|---|---|---|
| 3,585,537 | A | 6/1971 | Rennick et al. |
| 3,596,228 | A | 7/1971 | Reed, Jr. et al. |
| 3,727,710 | A | 4/1973 | Sanders et al. |
| 3,815,272 | A | 6/1974 | Marleau |
| 3,899,028 | A | 8/1975 | Morris et al. |

(Continued)

FOREIGN PATENT DOCUMENTS

JP      07244150      9/1995

(Continued)

OTHER PUBLICATIONS

Parkinson, Bradford W., et al., "Global Positioning System: Theory and Applications, vol. II", Bradford W. Parkinson and James J. Spiker, Jr., eds., *Global Positioning System: Theory and Applicaitons*, vol. II, 1995, *AIAA*, Reston, VA, USA, pp. 3-50, (1995),3-50.

(Continued)

*Primary Examiner* — Thomas H Tarcza
*Assistant Examiner* — Frank McGue
(74) *Attorney, Agent, or Firm* — Law Office of Mark Brown, LLC; Mark E. Brown (57) ABSTRACT

A GNSS-based, bidirectional mobile communication system includes a mobile unit, such as a vehicle or a personal mobile system, with GNSS (e.g., GPS) and Internet (worldwide web) access. A base station also has GNSS and Internet access, and provides differential (e.g., DGPS) correctors to the mobile unit via the Internet. The Internet communications link enables audio and/or video (AV) clips to be recorded and played back by the mobile unit based on its GNSS location. The playback function can be triggered by the mobile unit detecting a predetermined GNSS location associated with a particular clip, which can be GNSS position-stamped when recorded. Alternatively, clips can be generated by utilities and loaded by the application either from a personal computer or automatically over the Internet. Moreover, maps, vehicle travel paths and images associated with particular GNSS-defined locations, such as waypoints, can be updated and position-stamped on the data server. A GNSS-based mobile communication method and a storage medium encoded with a machine-readable code for mobile communications are also provided.

19 Claims, 5 Drawing Sheets

U.S. PATENT DOCUMENTS

| | | |
|---|---|---|
| 3,987,456 A | 10/1976 | Gelin |
| 4,132,272 A | 1/1979 | Holloway et al. |
| 4,170,776 A | 10/1979 | MacDoran et al. |
| 4,180,133 A | 12/1979 | Collogan et al. |
| 4,398,162 A | 8/1983 | Nagai |
| 4,453,614 A | 6/1984 | Allen et al. |
| 4,529,990 A | 7/1985 | Brunner |
| 4,637,474 A | 1/1987 | Leonard |
| 4,667,203 A | 5/1987 | Counselman, III |
| 4,689,556 A | 8/1987 | Cedrone |
| 4,694,264 A | 9/1987 | Owens et al. |
| 4,710,775 A | 12/1987 | Coe |
| 4,714,435 A | 12/1987 | Stipanuk et al. |
| 4,739,448 A | 4/1988 | Rowe et al. |
| 4,751,512 A | 6/1988 | Longaker |
| 4,769,700 A | 9/1988 | Pryor |
| 4,785,463 A | 11/1988 | Janc et al. |
| 4,802,545 A | 2/1989 | Nystuen et al. |
| 4,812,991 A | 3/1989 | Hatch |
| 4,858,132 A | 8/1989 | Holmquist |
| 4,864,320 A | 9/1989 | Munson et al. |
| 4,894,662 A | 1/1990 | Counselman |
| 4,916,577 A | 4/1990 | Dawkins |
| 4,918,607 A | 4/1990 | Wible |
| 4,963,889 A | 10/1990 | Hatch |
| 5,031,704 A | 7/1991 | Fleischer et al. |
| 5,100,229 A | 3/1992 | Lundberg et al. |
| 5,134,407 A | 7/1992 | Lorenz et al. |
| 5,148,179 A | 9/1992 | Allison |
| 5,152,347 A | 10/1992 | Miller |
| 5,155,490 A | 10/1992 | Spradley et al. |
| 5,155,493 A | 10/1992 | Thursby et al. |
| 5,156,219 A | 10/1992 | Schmidt et al. |
| 5,165,109 A | 11/1992 | Han et al. |
| 5,173,715 A | 12/1992 | Rodal et al. |
| 5,177,489 A | 1/1993 | Hatch |
| 5,185,610 A | 2/1993 | Ward et al. |
| 5,191,351 A | 3/1993 | Hofer et al. |
| 5,202,829 A | 4/1993 | Geier |
| 5,207,239 A | 5/1993 | Schwitalia |
| 5,239,669 A | 8/1993 | Mason et al. |
| 5,255,756 A | 10/1993 | Follmer et al. |
| 5,268,695 A | 12/1993 | Dentinger et al. |
| 5,293,170 A | 3/1994 | Lorenz et al. |
| 5,294,970 A | 3/1994 | Dornbusch et al. |
| 5,296,861 A | 3/1994 | Knight |
| 5,311,149 A | 5/1994 | Wagner et al. |
| 5,323,322 A | 6/1994 | Mueller et al. |
| 5,334,987 A * | 8/1994 | Teach ............................ 701/214 |
| 5,343,209 A | 8/1994 | Sennott et al. |
| 5,345,245 A | 9/1994 | Ishikawa et al. |
| 5,359,332 A | 10/1994 | Allison et al. |
| 5,361,212 A | 11/1994 | Class et al. |
| 5,365,447 A | 11/1994 | Dennis |
| 5,369,589 A | 11/1994 | Steiner |
| 5,375,059 A | 12/1994 | Kyrtsos et al. |
| 5,390,124 A | 2/1995 | Kyrtsos |
| 5,390,125 A | 2/1995 | Sennott et al. |
| 5,390,207 A | 2/1995 | Fenton et al. |
| 5,416,712 A | 5/1995 | Geier et al. |
| 5,442,363 A | 8/1995 | Remondi |
| 5,444,453 A | 8/1995 | Lalezari |
| 5,451,964 A | 9/1995 | Babu |
| 5,467,282 A | 11/1995 | Dennis |
| 5,471,217 A | 11/1995 | Hatch et al. |
| 5,476,147 A | 12/1995 | Fixemer |
| 5,477,228 A | 12/1995 | Tiwari et al. |
| 5,477,458 A | 12/1995 | Loomis |
| 5,490,073 A | 2/1996 | Kyrtsos |
| 5,491,636 A | 2/1996 | Robertson |
| 5,495,257 A | 2/1996 | Loomis |
| 5,504,482 A | 4/1996 | Schreder |
| 5,511,623 A | 4/1996 | Frasier |
| 5,519,620 A | 5/1996 | Talbot et al. |
| 5,521,610 A | 5/1996 | Rodal |
| 5,523,761 A | 6/1996 | Gildea |
| 5,534,875 A | 7/1996 | Diefes et al. |
| 5,543,804 A | 8/1996 | Buchler et al. |
| 5,546,093 A | 8/1996 | Gudat et al. |
| 5,548,293 A | 8/1996 | Cohen et al. |
| 5,561,432 A | 10/1996 | Knight |
| 5,563,786 A | 10/1996 | Torii |
| 5,568,152 A | 10/1996 | Janky et al. |
| 5,568,162 A | 10/1996 | Samsel et al. |
| 5,583,513 A | 12/1996 | Cohen |
| 5,589,835 A | 12/1996 | Gildea et al. |
| 5,592,382 A | 1/1997 | Colley |
| 5,596,328 A | 1/1997 | Stangeland et al. |
| 5,600,670 A | 2/1997 | Turney |
| 5,604,506 A | 2/1997 | Rodal |
| 5,608,393 A | 3/1997 | Hartman |
| 5,610,522 A | 3/1997 | Locatelli et al. |
| 5,610,616 A | 3/1997 | Vallot et al. |
| 5,610,845 A | 3/1997 | Slabinski |
| 5,612,883 A | 3/1997 | Shaffer et al. |
| 5,615,116 A | 3/1997 | Gudat et al. |
| 5,617,100 A | 4/1997 | Akiyoshi et al. |
| 5,617,317 A | 4/1997 | Ignagni |
| 5,621,646 A | 4/1997 | Enge et al. |
| 5,629,626 A * | 5/1997 | Russell et al. ................. 324/345 |
| 5,638,077 A | 6/1997 | Martin |
| 5,644,139 A | 7/1997 | Allen et al. |
| 5,664,632 A | 9/1997 | Frasier |
| 5,673,491 A | 10/1997 | Brenna et al. |
| 5,680,140 A | 10/1997 | Loomis |
| 5,684,696 A | 11/1997 | Rao et al. |
| 5,706,015 A | 1/1998 | Chen et al. |
| 5,717,593 A | 2/1998 | Gvili |
| 5,725,230 A | 3/1998 | Walkup |
| 5,731,786 A | 3/1998 | Abraham et al. |
| 5,739,785 A | 4/1998 | Allison et al. |
| 5,757,316 A | 5/1998 | Buchler |
| 5,765,123 A | 6/1998 | Nimura et al. |
| 5,777,578 A | 7/1998 | Chang et al. |
| 5,810,095 A | 9/1998 | Orbach et al. |
| 5,828,336 A | 10/1998 | Yunck et al. |
| 5,838,562 A | 11/1998 | Gudat et al. |
| 5,854,987 A | 12/1998 | Sekine et al. |
| 5,862,501 A | 1/1999 | Talbot et al. |
| 5,864,315 A | 1/1999 | Welles et al. |
| 5,864,318 A | 1/1999 | Cozenza et al. |
| 5,875,408 A | 2/1999 | Bendett et al. |
| 5,877,725 A | 3/1999 | Kalafus |
| 5,890,091 A | 3/1999 | Talbot et al. |
| 5,899,957 A | 5/1999 | Loomis |
| 5,906,645 A | 5/1999 | Kagawa et al. |
| 5,912,798 A | 6/1999 | Chu |
| 5,914,685 A | 6/1999 | Kozlov et al. |
| 5,917,448 A | 6/1999 | Mickelson |
| 5,918,558 A | 7/1999 | Susag |
| 5,919,242 A | 7/1999 | Greatline et al. |
| 5,923,270 A | 7/1999 | Sampo et al. |
| 5,926,079 A | 7/1999 | Heine et al. |
| 5,927,603 A | 7/1999 | McNabb |
| 5,928,309 A | 7/1999 | Korver et al. |
| 5,929,721 A | 7/1999 | Munn et al. |
| 5,933,110 A | 8/1999 | Tang |
| 5,935,183 A | 8/1999 | Sahm et al. |
| 5,936,573 A | 8/1999 | Smith |
| 5,940,026 A | 8/1999 | Popeck |
| 5,941,317 A | 8/1999 | Mansur |
| 5,943,008 A | 8/1999 | Van Dusseldorp |
| 5,944,770 A | 8/1999 | Enge et al. |
| 5,945,917 A | 8/1999 | Harry |
| 5,949,371 A | 9/1999 | Nichols |
| 5,955,973 A | 9/1999 | Anderson |
| 5,956,250 A | 9/1999 | Gudat et al. |
| 5,969,670 A | 10/1999 | Kalafus et al. |
| 5,987,383 A | 11/1999 | Keller et al. |
| 6,014,101 A | 1/2000 | Loomis |
| 6,014,608 A | 1/2000 | Seo |
| 6,018,313 A | 1/2000 | Engelmayer et al. |
| 6,023,239 A | 2/2000 | Kovach |
| 6,052,647 A * | 4/2000 | Parkinson et al. ............ 701/215 |
| 6,055,477 A | 4/2000 | McBurney et al. |
| 6,057,800 A | 5/2000 | Yang et al. |
| 6,061,390 A | 5/2000 | Meehan et al. |

| | | | | | | |
|---|---|---|---|---|---|---|
| 6,061,632 | A | 5/2000 | Dreier | 6,732,024 B2 | 5/2004 | Rekow et al. |
| 6,062,317 | A | 5/2000 | Gharsalli | 6,744,404 B1 | 6/2004 | Whitehead et al. |
| 6,069,583 | A | 5/2000 | Silvestrin et al. | 6,754,584 B2 | 6/2004 | Pinto et al. |
| 6,076,612 | A | 6/2000 | Carr | 6,774,843 B2 | 8/2004 | Takahashi |
| 6,081,171 | A | 6/2000 | Ella | 6,792,380 B2 | 9/2004 | Toda |
| 6,100,842 | A | 8/2000 | Dreier et al. | 6,819,269 B2 | 11/2004 | Flick |
| 6,122,595 | A | 9/2000 | Varley et al. | 6,822,314 B1 | 11/2004 | Beasom |
| 6,128,574 | A | 10/2000 | Diekhans | 6,865,465 B2 | 3/2005 | McClure |
| 6,144,335 | A | 11/2000 | Rogers | 6,865,484 B2 | 3/2005 | Miyasaka et al. |
| 6,191,730 | B1 | 2/2001 | Nelson, Jr. | 6,900,992 B2 | 5/2005 | Kelly et al. |
| 6,191,733 | B1 | 2/2001 | Dizchavez | 6,922,635 B2 | 7/2005 | Rorabaugh |
| 6,198,430 | B1 | 3/2001 | Hwang et al. | 6,931,233 B1 | 8/2005 | Tso et al. |
| 6,198,992 | B1 | 3/2001 | Winslow | 6,967,538 B2 | 11/2005 | Woo |
| 6,199,000 | B1 | 3/2001 | Keller et al. | 6,990,399 B2 | 1/2006 | Hrazdera et al. |
| 6,205,401 | B1 | 3/2001 | Pickhard et al. | 7,006,032 B2 | 2/2006 | King et al. |
| 6,215,828 | B1 | 4/2001 | Signell et al. | 7,026,982 B2 | 4/2006 | Toda et al. |
| 6,229,479 | B1 | 5/2001 | Kozlov et al. | 7,027,918 B2 | 4/2006 | Zimmerman et al. |
| 6,230,097 | B1 | 5/2001 | Dance et al. | 7,031,725 B2 | 4/2006 | Rorabaugh |
| 6,233,511 | B1 | 5/2001 | Berger et al. | 7,089,099 B2 | 8/2006 | Shostak et al. |
| 6,236,916 | B1 | 5/2001 | Staub et al. | 7,142,956 B2 | 11/2006 | Heiniger et al. |
| 6,236,924 | B1 | 5/2001 | Motz | 7,162,348 B2 | 1/2007 | McClure et al. |
| 6,253,160 | B1 | 6/2001 | Hanseder | 7,191,061 B2 | 3/2007 | McKay et al. |
| 6,256,583 | B1 | 7/2001 | Sutton | 7,231,290 B2 | 6/2007 | Steichen et al. |
| 6,259,398 | B1 | 7/2001 | Riley | 7,248,211 B2 | 7/2007 | Hatch et al. |
| 6,266,595 | B1 | 7/2001 | Greatline et al. | 7,271,766 B2 | 9/2007 | Zimmerman et al. |
| 6,285,320 | B1 | 9/2001 | Olster et al. | 7,277,784 B2 | 10/2007 | Weiss |
| 6,292,132 | B1 | 9/2001 | Wilson | 7,292,186 B2 | 11/2007 | Miller et al. |
| 6,307,505 | B1 | 10/2001 | Green | 7,324,915 B2 | 1/2008 | Altmann |
| 6,313,788 | B1 | 11/2001 | Wilson | 7,358,896 B2 | 4/2008 | Gradincic et al. |
| 6,314,348 | B1 | 11/2001 | Winslow | 7,373,231 B2 | 5/2008 | McClure et al. |
| 6,325,684 | B1 | 12/2001 | Knight | 7,383,114 B1 * | 6/2008 | Lange et al. ............... 701/50 |
| 6,336,066 | B1 | 1/2002 | Pellenc et al. | 7,388,539 B2 | 6/2008 | Whitehead et al. |
| 6,345,231 | B2 | 2/2002 | Quincke | 7,395,769 B2 | 7/2008 | Jensen |
| 6,356,602 | B1 | 3/2002 | Rodal et al. | 7,428,259 B2 | 9/2008 | Wang et al. |
| 6,377,889 | B1 | 4/2002 | Soest | 7,437,230 B2 | 10/2008 | McClure et al. |
| 6,380,888 | B1 | 4/2002 | Kucik | 7,451,030 B2 | 11/2008 | Eglington et al. |
| 6,389,345 | B2 | 5/2002 | Phelps | 7,479,900 B2 | 1/2009 | Horstemeyer |
| 6,392,589 | B1 | 5/2002 | Rogers et al. | 7,505,848 B2 | 3/2009 | Flann et al. |
| 6,397,147 | B1 | 5/2002 | Whitehead | 7,522,100 B2 | 4/2009 | Yang et al. |
| 6,415,229 | B1 | 7/2002 | Diekhans | 7,571,029 B2 | 8/2009 | Dai et al. |
| 6,418,031 | B1 | 7/2002 | Archambeault | 7,689,354 B2 | 3/2010 | Heiniger et al. |
| 6,421,003 | B1 | 7/2002 | Riley et al. | 2002/0045456 A1 * | 4/2002 | Obradovich ............... 455/457 |
| 6,424,915 | B1 | 7/2002 | Fukuda et al. | 2003/0014171 A1 | 1/2003 | Ma et al. |
| 6,431,576 | B1 | 8/2002 | Viaud et al. | 2003/0048929 A1 * | 3/2003 | Golden et al. ............. 382/115 |
| 6,434,462 | B1 | 8/2002 | Bevly et al. | 2003/0187560 A1 | 10/2003 | Keller et al. |
| 6,445,983 | B1 | 9/2002 | Dickson et al. | 2003/0208319 A1 * | 11/2003 | Ell et al. ............... 702/5 |
| 6,445,990 | B1 | 9/2002 | Manring | 2004/0039514 A1 | 2/2004 | Steichen et al. |
| 6,449,558 | B1 | 9/2002 | Small | 2004/0212533 A1 | 10/2004 | Whitehead et al. |
| 6,463,091 | B1 | 10/2002 | Zhodzicshsky et al. | 2005/0080559 A1 | 4/2005 | Ishibashi et al. |
| 6,463,374 | B1 | 10/2002 | Keller et al. | 2005/0090201 A1 * | 4/2005 | Lengies et al. ............. 455/41.2 |
| 6,466,871 | B1 | 10/2002 | Reisman et al. | 2005/0225955 A1 | 10/2005 | Grebenkemper et al. |
| 6,469,663 | B1 | 10/2002 | Whitehead et al. | 2005/0265494 A1 | 12/2005 | Goodings |
| 6,484,097 | B2 | 11/2002 | Fuchs et al. | 2006/0086295 A1 * | 4/2006 | Jensen ............... 111/118 |
| 6,501,422 | B1 | 12/2002 | Nichols | 2006/0167600 A1 | 7/2006 | Nelson et al. |
| 6,515,619 | B1 | 2/2003 | McKay, Jr. | 2006/0206246 A1 | 9/2006 | Walker |
| 6,516,271 | B2 | 2/2003 | Upadhyaya et al. | 2006/0215739 A1 | 9/2006 | Williamson et al. |
| 6,539,303 | B2 | 3/2003 | McClure et al. | 2007/0055441 A1 * | 3/2007 | Retterath et al. ............ 701/200 |
| 6,542,077 | B2 | 4/2003 | Joao | 2007/0078570 A1 | 4/2007 | Dai et al. |
| 6,549,835 | B2 | 4/2003 | Deguchi | 2007/0088447 A1 | 4/2007 | Stothert et al. |
| 6,553,299 | B1 | 4/2003 | Keller et al. | 2007/0121708 A1 | 5/2007 | Simpson |
| 6,553,300 | B2 | 4/2003 | Ma et al. | 2007/0205940 A1 | 9/2007 | Yang et al. |
| 6,553,311 | B2 | 4/2003 | Ahearn et al. | 2007/0285308 A1 | 12/2007 | Bauregger et al. |
| 6,570,534 | B2 | 5/2003 | Cohen et al. | 2008/0129586 A1 | 6/2008 | Martin |
| 6,577,952 | B2 | 6/2003 | Geier et al. | 2008/0204312 A1 | 8/2008 | Euler |
| 6,587,761 | B2 | 7/2003 | Kumar | 2009/0089015 A1 * | 4/2009 | Bell et al. ............... 702/188 |
| 6,606,542 | B2 | 8/2003 | Hauwiller et al. | 2009/0171583 A1 | 7/2009 | DiEsposti |
| 6,611,228 | B2 | 8/2003 | Toda et al. | 2009/0174597 A1 | 7/2009 | DiLellio et al. |
| 6,611,754 | B2 | 8/2003 | Klein | 2009/0174622 A1 | 7/2009 | Kanou |
| 6,611,755 | B1 | 8/2003 | Coffee et al. | 2009/0177395 A1 | 7/2009 | Stelpstra |
| 6,622,091 | B2 | 9/2003 | Perlmutter et al. | 2009/0177399 A1 | 7/2009 | Park et al. |
| 6,631,916 | B1 | 10/2003 | Miller | 2009/0259397 A1 | 10/2009 | Stanton |
| 6,643,576 | B1 | 11/2003 | O'Connor et al. | 2009/0259707 A1 | 10/2009 | Martin et al. |
| 6,646,603 | B2 | 11/2003 | Dooley et al. | 2009/0262014 A1 | 10/2009 | DiEsposti |
| 6,657,875 | B1 | 12/2003 | Zeng et al. | 2009/0262018 A1 | 10/2009 | Vasilyev et al. |
| 6,671,587 | B2 | 12/2003 | Hrovat et al. | 2009/0262974 A1 | 10/2009 | Lithopoulos |
| 6,688,403 | B2 | 2/2004 | Bernhardt et al. | 2009/0265054 A1 | 10/2009 | Basnayake |
| 6,703,973 | B1 | 3/2004 | Nichols | 2009/0265101 A1 | 10/2009 | Jow |
| 6,711,501 | B2 | 3/2004 | McClure et al. | 2009/0265104 A1 | 10/2009 | Shroff |
| 6,721,638 | B2 | 4/2004 | Zeitler | 2009/0273372 A1 | 11/2009 | Brenner |

| | | |
|---|---|---|
| 2009/0273513 A1 | 11/2009 | Huang |
| 2009/0274079 A1 | 11/2009 | Bhatia et al. |
| 2009/0274113 A1 | 11/2009 | Katz |
| 2009/0276155 A1 | 11/2009 | Jeerage et al. |
| 2009/0295633 A1 | 12/2009 | Pinto et al. |
| 2009/0295634 A1 | 12/2009 | Yu et al. |
| 2009/0299550 A1 | 12/2009 | Baker |
| 2009/0322597 A1 | 12/2009 | Medina Herrero et al. |
| 2009/0322598 A1 | 12/2009 | Fly et al. |
| 2009/0322600 A1 | 12/2009 | Whitehead et al. |
| 2009/0322601 A1 | 12/2009 | Ladd et al. |
| 2009/0322606 A1 | 12/2009 | Gronemeyer |
| 2009/0326809 A1 | 12/2009 | Colley et al. |
| 2010/0013703 A1 | 1/2010 | Tekawy et al. |
| 2010/0026569 A1 | 2/2010 | Amidi |
| 2010/0030470 A1 | 2/2010 | Wang et al. |
| 2010/0039316 A1 | 2/2010 | Gronemeyer et al. |
| 2010/0039318 A1 | 2/2010 | Kmiecik |
| 2010/0039320 A1 | 2/2010 | Boyer et al. |
| 2010/0039321 A1 | 2/2010 | Abraham |
| 2010/0060518 A1 | 3/2010 | Bar-Sever et al. |
| 2010/0063649 A1 | 3/2010 | Bing-Fei et al. |
| 2010/0084147 A1 | 4/2010 | Aral |
| 2010/0085249 A1 | 4/2010 | Ferguson et al. |
| 2010/0085253 A1 | 4/2010 | Ferguson et al. |
| 2010/0103033 A1 | 4/2010 | Roh |
| 2010/0103034 A1 | 4/2010 | Tobe et al. |
| 2010/0103038 A1 | 4/2010 | Yeh et al. |
| 2010/0103040 A1 | 4/2010 | Broadbent |
| 2010/0106414 A1 | 4/2010 | Whitehead |
| 2010/0106445 A1 | 4/2010 | Kondoh |
| 2010/0109944 A1 | 5/2010 | Whitehead et al. |
| 2010/0109945 A1 | 5/2010 | Roh |
| 2010/0109947 A1 | 5/2010 | Rintanen |
| 2010/0109948 A1 | 5/2010 | Razoumov et al. |
| 2010/0109950 A1 | 5/2010 | Roh |
| 2010/0111372 A1 | 5/2010 | Zheng et al. |
| 2010/0114483 A1 | 5/2010 | Heo et al. |
| 2010/0117479 A1 | 5/2010 | Velde et al. |
| 2010/0117899 A1 | 5/2010 | Papadimitratos et al. |
| 2010/0117900 A1 | 5/2010 | Van Diggelen et al. |
| 2010/0124210 A1 | 5/2010 | Lo |
| 2010/0124212 A1 | 5/2010 | Lo |
| 2010/0134354 A1 | 6/2010 | Lennen |
| 2010/0149025 A1 | 6/2010 | Meyers et al. |
| 2010/0149030 A1 | 6/2010 | Verma et al. |
| 2010/0149033 A1 | 6/2010 | Abraham |
| 2010/0149034 A1 | 6/2010 | Chen |
| 2010/0149037 A1 | 6/2010 | Cho |
| 2010/0150284 A1 | 6/2010 | Fielder et al. |
| 2010/0152949 A1 | 6/2010 | Nunan et al. |
| 2010/0156709 A1 | 6/2010 | Zhang et al. |
| 2010/0156712 A1 | 6/2010 | Pisz et al. |
| 2010/0156718 A1 | 6/2010 | Chen |
| 2010/0159943 A1 | 6/2010 | Salmon |
| 2010/0161179 A1 | 6/2010 | McClure et al. |
| 2010/0161211 A1 | 6/2010 | Chang |
| 2010/0161568 A1 | 6/2010 | Xiao |
| 2010/0171660 A1 | 7/2010 | Shyr et al. |
| 2010/0171757 A1 | 7/2010 | Melamed |
| 2010/0185364 A1 | 7/2010 | McClure |
| 2010/0185366 A1 | 7/2010 | Heiniger et al. |
| 2010/0185389 A1 | 7/2010 | Woodard |
| 2010/0188285 A1 | 7/2010 | Collins |
| 2010/0188286 A1 | 7/2010 | Bickerstaff et al. |
| 2010/0189163 A1 | 7/2010 | Burgi et al. |
| 2010/0207811 A1 | 8/2010 | Lackey |
| 2010/0210206 A1 | 8/2010 | Young |
| 2010/0211248 A1 | 8/2010 | Craig et al. |
| 2010/0211315 A1 | 8/2010 | Toda |
| 2010/0211316 A1 | 8/2010 | DaSilva et al. |
| 2010/0231751 A1* | 9/2010 | Obradovich ............... 348/231.3 |

FOREIGN PATENT DOCUMENTS

| | | |
|---|---|---|
| WO | WO9836288 | 8/1998 |
| WO | WO0024239 | 5/2000 |
| WO | WO03019430 | 3/2003 |
| WO | WO2005/119386 | 12/2005 |
| WO | WO2009/066183 | 5/2009 |
| WO | WO2009126587 | 10/2009 |
| WO | WO2009/148638 | 12/2009 |

OTHER PUBLICATIONS

"Orthman Manufacturing Co., www.orthman.com/htm;guidance.htm", 2004, regarding the "Tracker Quick-Hitch".

Lin, Dai et al., "Real-time Attitude Determination fro Microsatellite by Lamda Method Combined with Kalman Filtering", *A Collection fof the 22nd AIAA International Communications Satellite Systems Conference and Exhibit Technical Paers* vol. 1, Monterey, California American Institute of Aeronautics and Astronautics, Inc., (May 2004), 136-143.

Xu, Jiangning et al., "An EHW Architecture for Real-Time GPS Attitude Determination Based on Parallel Genetic Algorithm", *The Computer SocietyProceedings of the 2002 NASA/DOD Conference on Evolvable Hardware (EH'02)*, (2002).

Han, Shaowel et al., "Single-Epoch Ambiguity Resolution for Real-Time GPS Attitude Determination with the Aid of One-Dimensional Optical Fiber Gyro", *GPS Solutions*, vol. 3, No. 1, pp. 5-12 (1999) *John Wiley & Sons, Inc.*

Park, Chansik et al., "Integer Ambiguity Resolution for GPS Based Attitude Determination System", *SICE '09*, Jul. 29-31, Chiba, 1115-1120.

Last, J. D., et al., "Effect of skywave interference on coverage of radiobeacon DGPS stations", *IEEE Proc.-Radar, Sonar Navig.*, vol. 144, No. 3, Jun. 1997, pp. 163-168.

"International Search Report and Written Opinion", PCT/US2004/015678, filed May 17, 2005, Jun. 21, 2005.

"ISO", *11783 Part 7 Draft Amendment 1 Annex*, Paragraphs B.6 and B.7.ISO 11783-7 2004 DAM1, ISO: Mar. 8, 2004.

Kaplan, E D., "Understanding GPS: Principles and Applications", *Artech House*, MA, 1996.

Irsigler, M et al., "PPL Tracking Performance in the Presence of Oscillator Phase Noise", *GPS Solutions*, vol. 5, No. 4, pp. 45-57 (2002).

Ward, Phillip W., "Performance Comparisons Between FLL, PLL and a Novel FLL-Assisted-PLL Carrier Tracking Loop Under RF Interference Conditions", *11th Int. Tech Meeting of the Satellite DIvision of the U.S. Inst. of Navigation*, Nashville, TN, Sep. 15-18, 783-795, 1998.

Bevly, David M., "Comparison of INS v. Carrier-Phase DGPS for Attitude Determination in the Control of Off-Road Vehicles" *ION 55th Annual Meeting*; Jun. 28-30, 1999; Cambridge, Massachusetts; pp. 497-504.

Keicher, R. et al., "Automatic Guidance for Agricultural Vehicles in Europe", *Computers and Electronics in Agriculture*, vol. 25, (Jan. 2000),169-194.

"International Search Report", PCT/US09/479976 (Aug. 11, 2009).
"International Search Report", PCT/AU/2008/000002, (Feb. 28, 2008).
"International Search Report", PCT/US09/33693, (Mar. 30, 2009).
"International Search Report", PCT/US09/039686, (May 26, 2009).
"International Search Report,", PCT/US09/34376, (Nov. 2, 2009).
"International Search Report and Written Opinion", *International Searching Authority*, PCT/US08/88070, Feb. 9, 2009.
"International Search Report", PCT/US09/33567, (Feb. 9, 2009).
"International Search Report and Written Opinion", PCT/IB2008/003796, (Jul. 15, 2009).
"International Search Report / Written Opinion", PCT/US09/63594, (Jan. 11, 2010).
"International Search Report", PCT/U509/60668, (Dec. 9, 2009).
"International Search Report", PCT/U509/067693, (Jan. 26, 2010).
"International Search Report and Written Opinion", PCT/US10/21334, (Mar. 12, 2010).

Rho, Hyundho et al., "Dual-Frequency GPS Precise Point Positioning with WADGPS Corrections", [retrieved on May 18, 2010]. *Retrieved from the Internet:* , URL: http://gauss.gge.unb.ca/papers.pdf/iongnss2005.rho.wadgps.pdf, (Jul. 12, 2006).

"Eurocontrol, Pegasus Technical Notes on SBAS", report [online], Dec. 7, 2004 [retrieved on May 18, 2010]. Retrieved from the Internet: <URL: http://www.icao.int/icao/en/ro/nacc/meetings/2004/gnxx/documentation/Pegasus/tn.pdf>, (Dec. 7, 2004), p. 89 paras [0001]-[0004].

"ARINC Engineering Services, Interface Specification IS-GPS-200, Revision D", Online [retrieved on May 18, 2010]. Retrieved from the Internet;<URL: http://www.navcen.uscg.gov/gps/geninfo/IS-GPS-200D.pdf>, (Dec. 7, 2004), p. 168 para [0001].

Schaer, et al, "Determination and Use of GPS Differential Code Bias Values", Presentation [online]. Revtrieved May 18, 2010. Retrieved from the Internet: <http://nng.esoc.esa.de/ws2006/REPR2.pdf>., (May 8, 2006).

"International Search Report", PCT/US10/26509., (Apr. 20, 2010).

Takac, Frank at al., "SmartRTK: A Novel Method of Processing Standardised RTCM Network RTK Information for High Precision Positioning", *Proceedings of ENC GNSS 2008*, Toulouse, France,(Apr. 22, 2008).

* cited by examiner

GNSS-BASED MOBILE COMMUNICATION SYSTEM AND METHOD

CROSS-REFERENCE TO RELATED APPLICATION

This application claims priority in U.S. Provisional Patent Application No. 61/043,224, filed Apr. 8, 2008, which is incorporated herein by reference.

BACKGROUND OF THE INVENTION

1. Field of the Invention

The present invention relates generally to the implementation of wireless communications for disseminating GNSS-based differential correctors and other position-locating information to mobile units, such as vehicles and personal navigation devices, and for receiving positional, operational and status information for real-time display, all via the Internet (worldwide web).

2. Description of the Related Art

Global Navigation Satellite System (GNSS) technology has become increasingly important in navigation, guidance and machine control applications in such varied fields as agriculture, transportation, mining and logistics. The widespread availability of differential correctors from various sources has improved accuracy to sub-centimeter levels using sophisticated differential correction techniques, such as real-time kinematic (RTK). Such finer accuracy and other performance enhancements tend to increase the applicability of differential global positioning systems (DGPS) to various operations and its usefulness on various types of mobile and stationary equipment. DGPS differential corrector distribution has been accomplished by 300 KHz beacon systems, FM transmitters and proprietary radio and satellite links. However, privately-sponsored, proprietary DGPS correction services have ongoing subscription fees. Other differential correction techniques have limited useful ranges and availability.

RTK correction utilizes carrier phase correction signals from fixed and known base station locations for processing by mobile or rover vehicles equipped with RTK-enabled GNSS receivers. Using RTK, vehicles can be automatically guided along predetermined guide paths to within less than a centimeter of course-variance, i.e. sub-centimeter accuracy navigation. Such higher-accuracy systems are in demand for precision agriculture and other operations.

Like GNSS, the Internet (worldwide web) has enabled a wide range of applications of increasing sophistication and technical capability. For example, digital telephone networks can interface with the Internet and enable the dissemination of GNSS information, including differential correctors. Commercially-available mapping services provide current, detailed visual content for many geographic regions. Combining these technologies enables triggering AV output derived from mapping services based on GNSS-identified locations, which can be identified by vehicle-mounted GNSS receiver equipment. Moreover, GNSS positioning information and differential correctors can be efficiently disseminated over digital telecommunications systems at relatively low cost and over relatively large areas.

Various operations can benefit from GNSS-derived information being disseminated among a number of vehicles for purposes of coordinating their activities. For example, agricultural spraying operations with fleets of aerial and/or ground-based vehicles can be coordinated by identifying and marketing treated field areas for centralized control in order to ensure complete coverage and to avoid overlaps. Vehicle routing and travel path information can be collected and disseminated in real-time to avoid collisions in multi-vehicle operations. For example, the flight paths of multiple aircraft can be simultaneously tracked using on-board, GNSS-based receivers and RF transmitters. The aircraft can thus be spaced apart with adequate safety margins for guiding through operations such as aerial spraying and firefighting.

Heretofore there has not been available a system or a method for combining these technologies with the advantages and features of the present invention.

SUMMARY OF THE INVENTION

In the practice of the present invention, a system and method are provided for the implementation of wireless communication to disseminate GNSS differential correctors, work orders and multimedia data to mobile units, such as ground and air vehicles and personal mobile systems. The system and method also accommodate bidirectional communication for receiving positional, operational and status information for real-time display. The Internet and other network systems can be utilized for data distribution. GNSS position-stamped audio and/or video clips can be generated by the mobile units and uploaded to the system for dissemination. Alternatively, clips generated by utilities can be loaded by the application either from a personal computer or remotely and automatically over the Internet. Trigger events for playing back the clips include proximity of the mobile unit to a predetermined GNSS-based position. Exemplary applications include ground-based and aerial agricultural operations. Other applications include navigation, security, logistics, firefighting, tourism, field inventory control, law enforcement, military and transportation.

DETAILED DESCRIPTION OF THE PREFERRED EMBODIMENTS

I. Introduction and Environment

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Certain terminology will be used in the following description for convenience in reference only and will not be limiting. For example, up, down, front, back, right and left refer to the invention as oriented in the view being referred to. The words "inwardly" and "outwardly" refer to directions toward and away from, respectively, the geometric center of the embodiment being described and designated parts thereof. Global navigation satellite systems (GNSS) are broadly defined to include GPS (U.S.), Galileo (proposed), GLONASS (Russia), Beidou (China), Compass (proposed), IRNSS (India, proposed), QZSS (Japan, proposed) and other current and future positioning technology using signals from satellites, with or without augmentation from terrestrial sources. Inertial navigation systems (INS) include gyroscopic (gyro) sensors, accelerometers and similar technologies for providing output corresponding to the inertia of moving components in all axes, i.e. through six degrees of freedom (positive and negative directions along transverse X, longitudinal Y and vertical Z axes). Yaw, pitch and roll refer to moving component rotation about the Z, X and Y axes respectively. Said terminology will include the words specifically mentioned, derivatives thereof and words of similar meaning.

II. Preferred Embodiment System 2.

Figure 1:
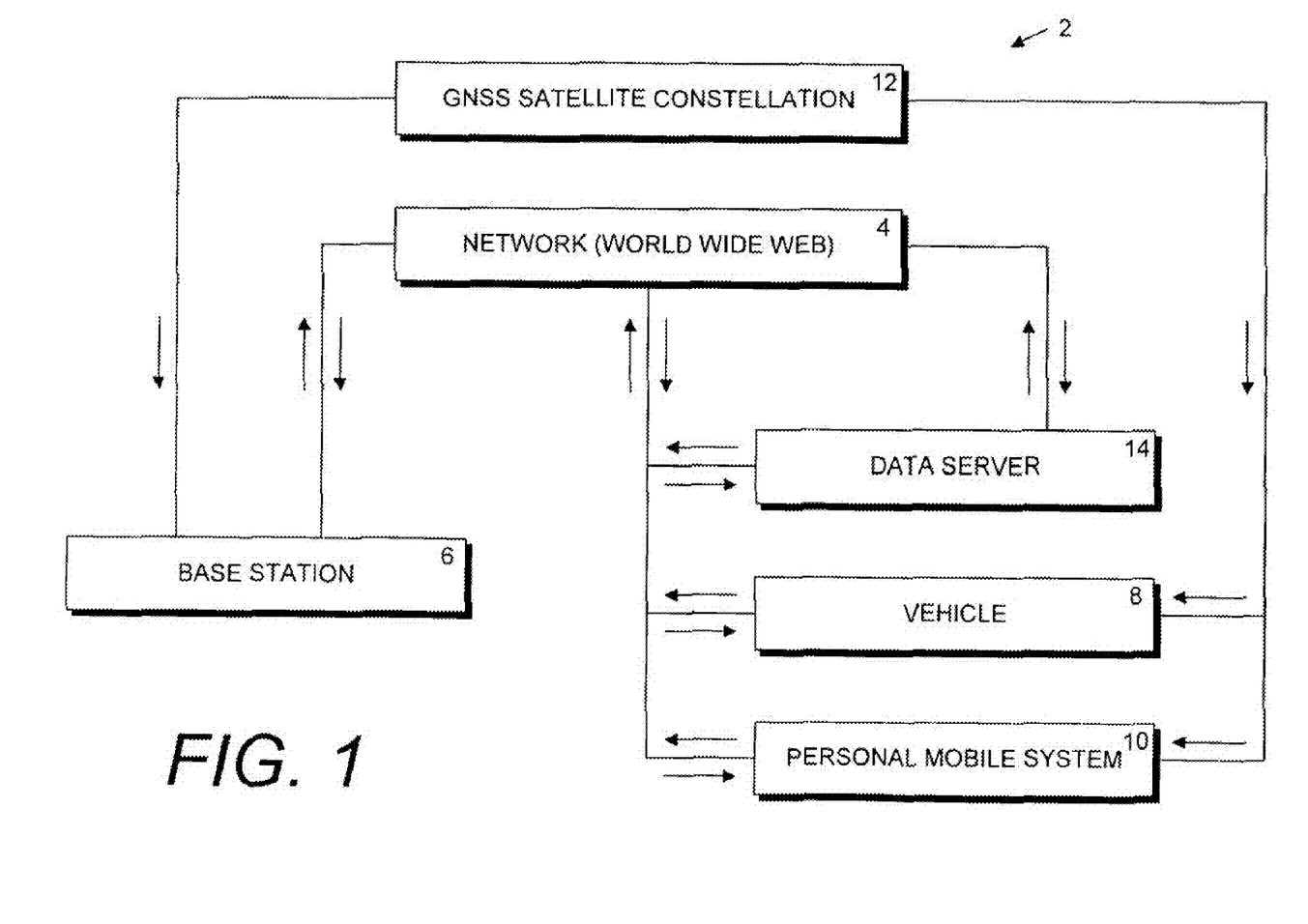
FIG. 1 is a block diagram of a GNSS-based mobile communication system embodying an aspect of the present invention.

Referring to the drawings in more detail, the reference numeral 2 generally designates a GNSS-based mobile bidirectional communication system embodying an aspect of the present invention. As shown in FIG. 1, the system 2 generally includes a network 4, which can comprise the Internet (worldwide web) or some other suitable network, such as a LAN or a WAN. A base station 6 can be located at a fixed, known location for differential comparison of GNSS signals received by it with signals received almost simultaneously by a vehicle 8 or a personal mobile system 10 from a GNSS satellite constellation 12 for well-known differential GPS (DGPS) error-correcting techniques. Such techniques include single and double differencing and RTK. Differential correctors can be wirelessly transmitted from the base station 6, or disseminated wirelessly via the Internet 4. Signals from the mobile units, e.g., the vehicle 8 and the personal mobile system 10, can be transmitted to the base station 6, also via the Internet 4. Enhanced positioning accuracy can also be achieved by using satellite-based augmentation systems (SBAS).

An optional data server 14 can also be connected to the Internet 4 and the mobile units 8, 10. The data server 14 can host a wide variety of information, such as commercial mapping service information and utilities. Information provided by Google Earth and similar content providers can be accessed via the Internet 4 for dissemination. The base station 6 can correlate information from various sources, such as the GNSS satellite constellation 12 and the data server 14 for dissemination to the mobile units 8, 10. For example, satellite images, waypoints and other location-specific mapping functions can be downloaded to the base station 6 and associated with their respective GNSS coordinates. Location-specific content can also be supplied via the mobile units 8, 10, which can be equipped with video cameras and other input devices. For example, a mobile unit 8, 10 could capture an image and position-stamp the digital recording with the corresponding GNSS data recorded by the mobile unit GNSS receiver.

Figure 2:
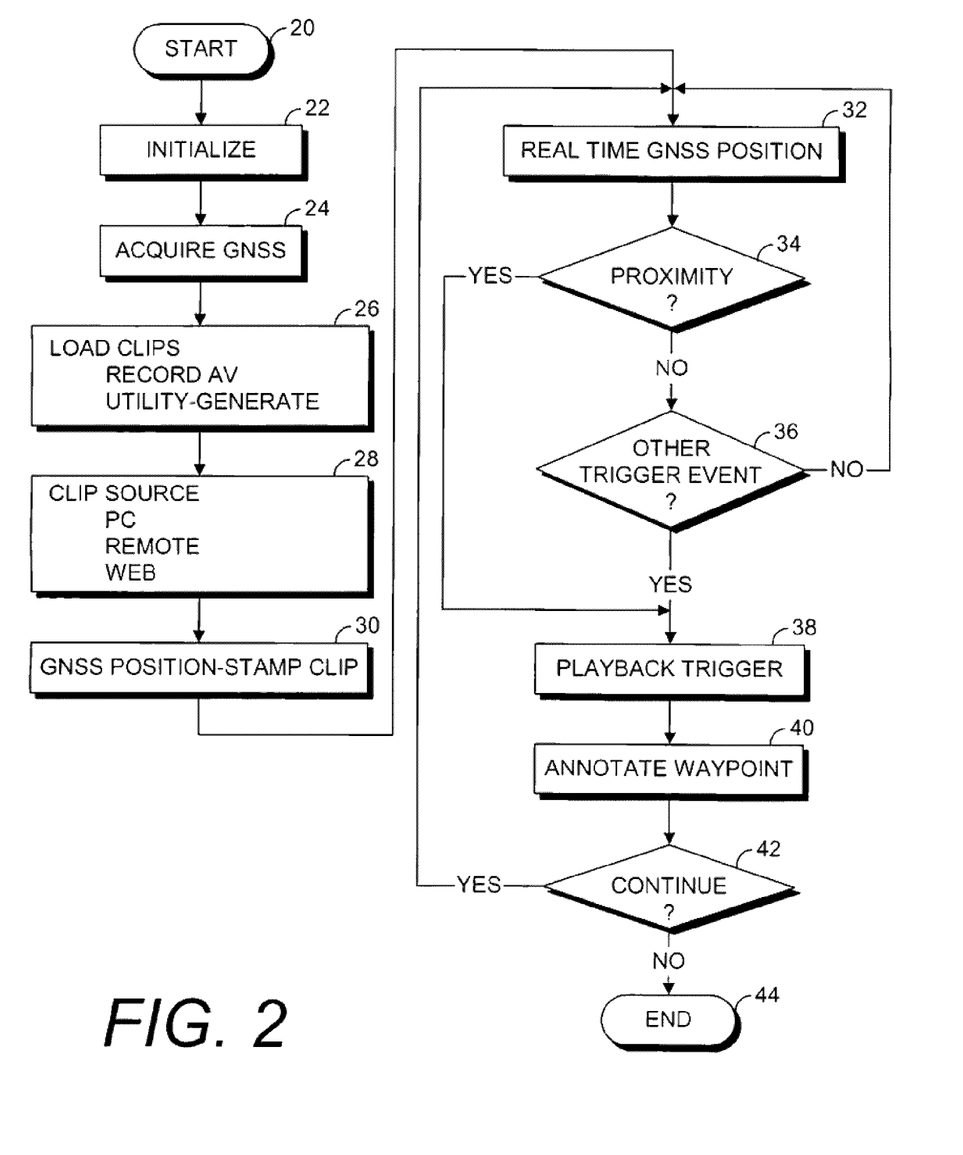
FIG. 2 is a flowchart of a GNSS-based mobile communication method embodying an aspect of the present invention.

FIG. 2 shows a method for mobile communications based on GNSS positioning. From a start 20 the system is initialized at 22, e.g., by preprogramming and/or preloading the base station 6 and the mobile units 8, 10 with program code instructions and/or data. GNSS (GPS) is acquired at step 24 simultaneously by the base station 6 and the mobile units 8, 10, thus enabling differential correction.

Information clips, such as audiovisual (AV) or utility-generated, are loaded on the data server 14 or other suitable storage at step 26. The clips can be created on the vehicle 8 or by the personal mobile system 10 for uploading via the Internet 4. Examples of alternative clip sources, including personal computers (PCs), remote sources and web-based sources, are depicted at step 28. The clip is GNSS-position stamped at step 30. A real-time GNSS position is determined by a mobile unit 8, 10 at step 32. For example, a mobile unit 8, 10 can be in motion and intermittently determine its GNSS-defined position using its receiver and, optionally, differential correction information from the base station 6 via a wireless-Internet-wireless connection. Control systems associated with the mobile units 8, 10 can also store information clips in onboard memory.

At decision box 34 the method determines if the mobile unit 8, 10 is in proximity to the GNSS position associated with a respective clip, from which an affirmative decision leads to a playback trigger at step 36 and a waypoint is annotated at step 38. A negative decision at proximity decision box 34 leads to a decision box for another trigger event at 36, from which a positive decision leads to the playback trigger 36 and a negative decision cycles back to the GNSS position determination step 32. An affirmative decision at "CONTINUE?" decision box 42 returns to the GNSS position determination step 32. A negative decision leads to an end 44.

The method described above can be implemented in various modes. For example, input content can be produced and recorded at the mobile units 8, 10 by AV or other equipment, providing a simultaneous image and audio content at a specific GNSS-defined position, i.e. a "georeference." Such content can include motion and still images and audio annotation. For example, on-the-fly recording of audio and/or video clips can be accomplished by a mobile unit 8, 10 on a particular route. Retracing the route can trigger the respective clips upon detecting proximity to the original recording sites, as detected by the GNSS system. For example, the proximity or other trigger event can initiate an output, such as an audio description associated with a particular GNSS-defined position. The clips can comprise any suitable format, such as TIFF or other photo image files and can be used to underlay other content, such as superimposed grids, etc. The clips can be named and cached and/or exported offline, for example, to the data server 14 for posting to the Internet 4 and further dissemination.

Alternatively, the georeference clips can be downloaded from other sources, such as commercial mapping services and digital photograph sources. For example, the data server 14 can receive clips from multiple vehicles 8 comprising a fleet for dissemination and downloading to other vehicles 8 in the fleet via the Internet 4. Users can thus obtain automated, real-time, georeference information pertaining to specific waypoints in both audio and video formats. Changed conditions can be monitored over time, for example, crop conditions as an indicator of growth progress. Moreover, triggering conditions can initiate various preprogrammed responses at the mobile units 8, 10 and remotely via the telecommunications/Internet connections. Thus, a locally-detected condition can initiate an appropriate response almost anywhere.

The system 2 can provide bidirectional, interactive communication between mobile units and other Internet-accessible resources, such as mapping services, which can provide real-time, GNSS position-stamped content corresponding to paths traveled by the mobile units. Forward-predicted content can also be communicated based on mobile unit operating parameters such as position, heading and speed. For example, an operator can receive annotated waypoint information for a forward-predicted course of travel, subject to periodic updating based on actual course. Both aerial and ground-based operations can utilize such information corresponding to the predictive mobile unit tracks.

The range of applications with particular detectable conditions and preprogrammed responses is virtually unlimited. Without limitation, they include:
- tourism with descriptions associated with current position views;
- field inventory control, including both generation and use, for describing situations at current positions;
- real-time tracking with status information;
- display of real-time traffic and speed camera information; and
- military and law enforcement applications, allowing rapid real-time updates of status with positional awareness.

Figure 3:
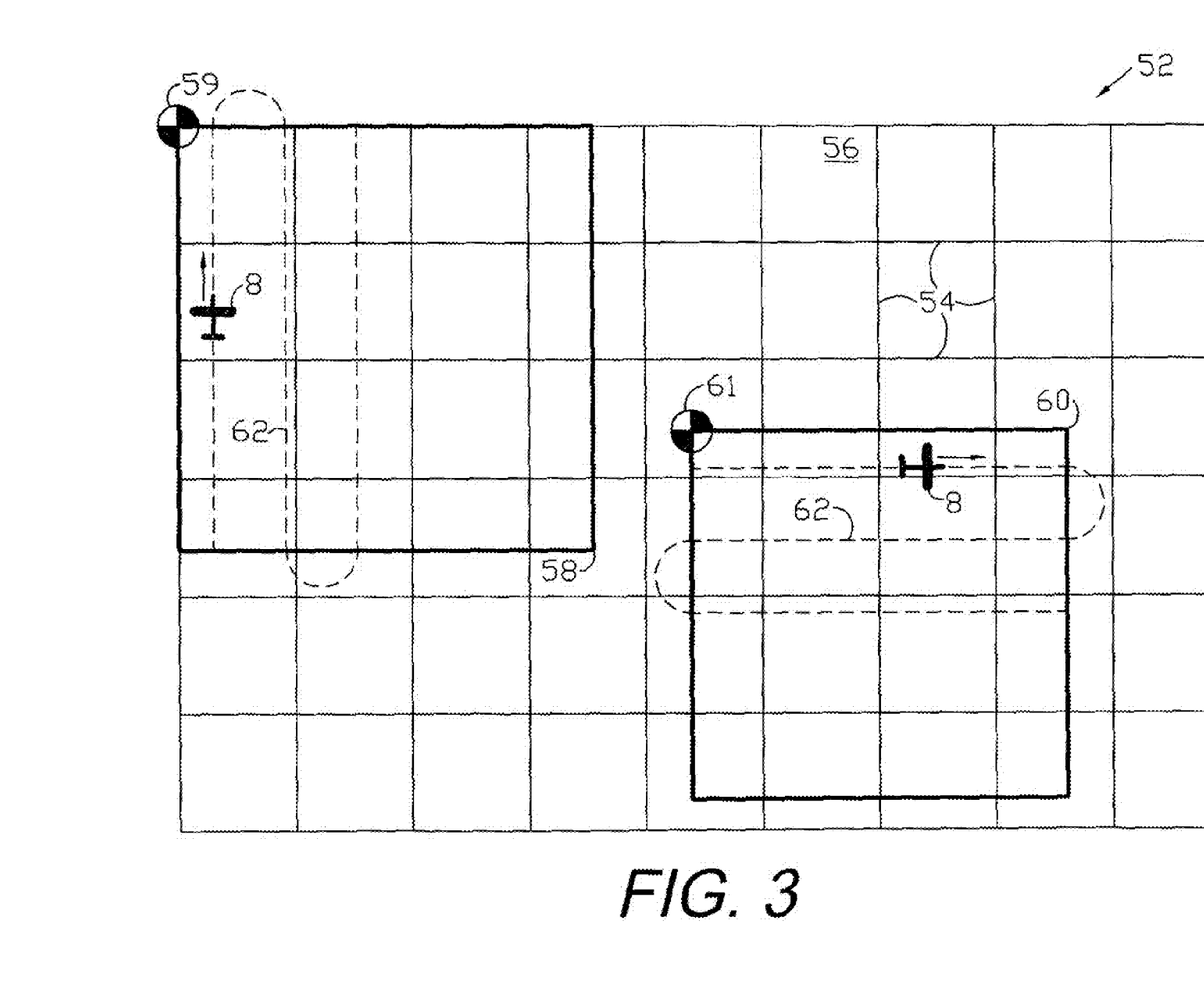
FIG. 3 is an area map of an aerial spraying operation conducted with the present invention.

FIG. 3 shows a map of an aerial agricultural operation, such as spraying fertilizer, herbicide or pesticide, utilizing the present invention. An area 52 is divided by a grid 54 into multiple sectors 56, which can be square as shown, or other suitable geometric shapes. The area 52 can be scaled as appropriate to define a field or an entire geographic region. Likewise, the sectors 56 can utilize a pre-existing grid or a system-generated grid with an appropriate scale factor. Treatment areas 58, 60 can be predefined with predetermined reference corners 59, 61 respectively. For example, an agricultural operation can be initiated by defining the reference corners 59, 61 and an appropriate scale determining the XY ranges, from which the number of complete and partial sectors 56 and the area involved can be calculated. Coverages of applied materials, such as fertilizers, herbicides and pesticides, can be calculated. The mobile unit 8 can comprise a cropduster aircraft as shown, for which a flight path 62 is calculated by the system 2. The mobile unit 8 can generate or download its flight path for storage in its onboard processor, or the flight path can be stored and accessed remotely, for example, from the base station 6 via the Internet and telecommunications connection. The actual flight path can be monitored in real-time throughout the operation using the present invention. Moreover, the flight paths of multiple aircraft can be monitored and displayed to ground-based controllers and the airborne pilots for real-time situational awareness, even in poor visibility conditions. Operations involving multiple aircraft can thus be controlled with a relatively high degree of safety and effectiveness. Still further, the displays in the base station 6 and the aircraft 8 can graphically display in real-time areas treated and remaining, which data can be recorded for documenting the operation. Gaps and overlaps in treatment can thus be minimized or avoided.

The system 2 can be programmed to automatically compute and select best-fit solutions for specific operations using auto-select functions for such variables as: starting corners 59, 61; scale; grid 54 location and spacing; and XY ranges. Other variables involved in such auto-select functions include: equipment parameters (e.g. speed, turning radius, swath width, etc.); treatment area 58, 60 configurations; materials being applied; ambient conditions; etc. Data from previous operations can be stored for reuse in subsequent operations, e.g., from season-to-season in agricultural operations.

Figure 4:
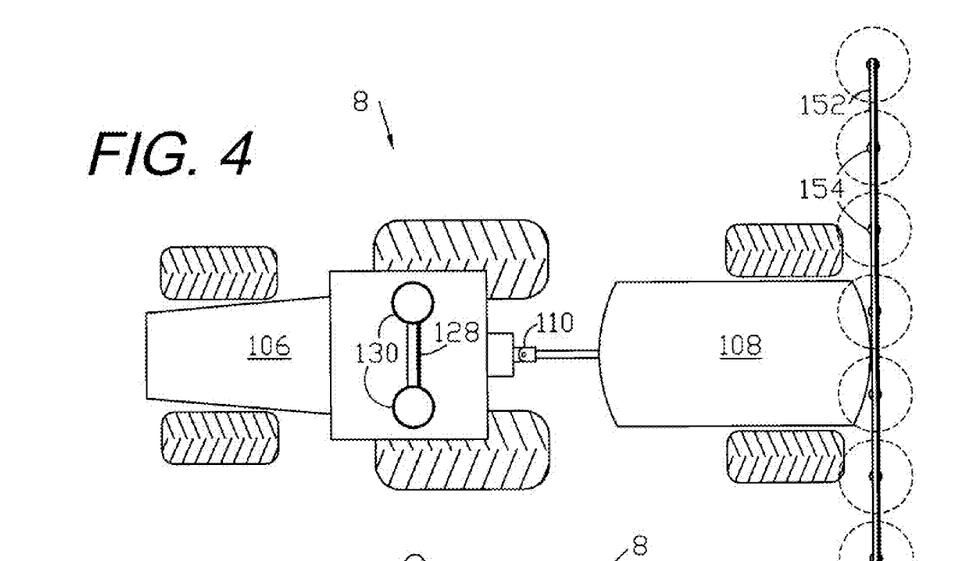
FIG. 4 is a top plan view of a tractor and implement, which comprise an example of a mobile unit of the system.
Figure 5:
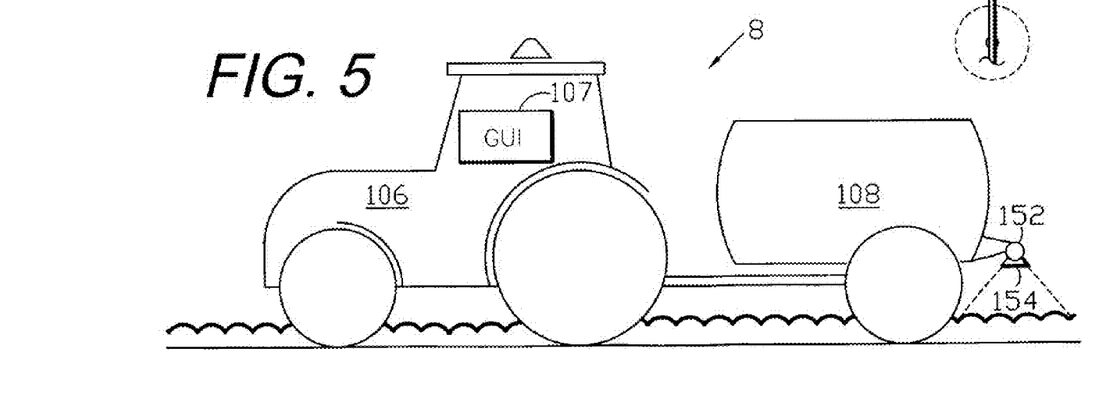
FIG. 5 is a side elevational view thereof.
Figure 6:
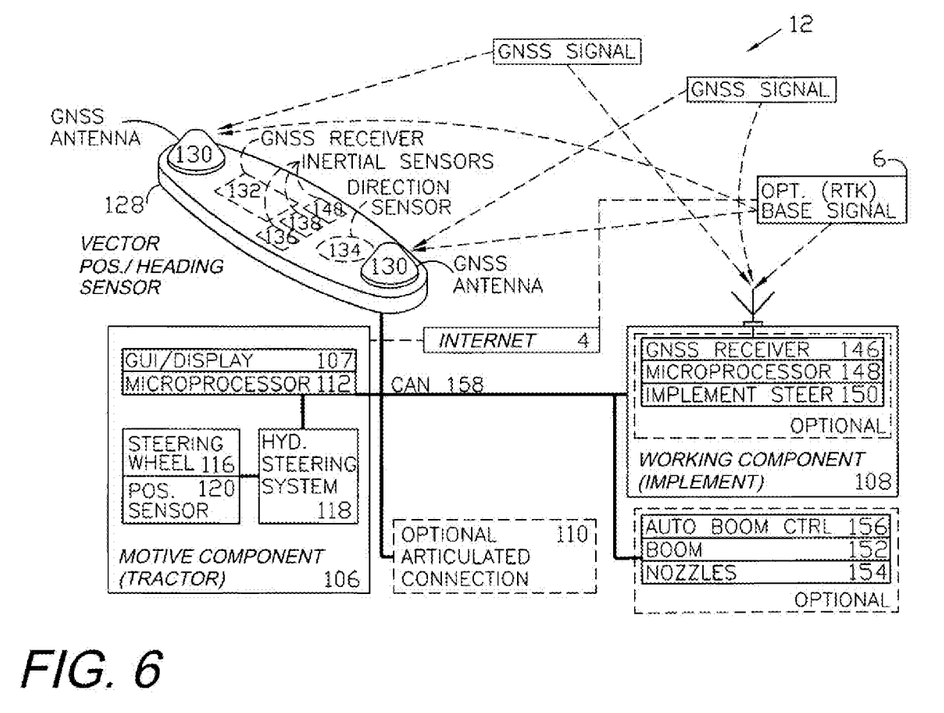
FIG. 6 is a block diagram of components thereof.

The communication system 2 can be applied to various equipment configurations for a wide range of applications. Such applications include equipment and components used in road construction, road maintenance, earthworking, excavation, mining, transportation, manufacturing, logistics, etc. For example, and without limitation on the generality of useful applications of the communication system 2, FIGS. 4-6 show an agricultural mobile unit 8 comprising a motive component 106 connected to a working component 108 through an optional articulated connection or hitch 110. Also by way of example, the motive component 106 can comprise a tractor and the working component 108 can comprise a ground-working implement, such as the sprayer shown. The tractor 106 can include a graphical user interface (GUI)/display 107 for displaying video clips, guidance, field maps and other content to the operator.

The mobile communication system 2 can be implemented with a tractor 106 including a microprocessor 112 connected to the GUI/display 107, which can be original equipment manufacture (OEM) general-purpose components, or special-purpose for the system 2. The tractor 106 also includes a steering wheel 116 for operating a hydraulic steering system 118. A position sensor 120 is connected to the steering wheel 116 and provides an output corresponding to its position. The components can be connected and external communications can be provided by suitable networks, buses, hardwired and wireless connections, a controller area network (CAN) 158 as shown, serial connections and virtualization technology (VT).

A position/heading (vector) sensor 128 can be mounted externally on the tractor 106, e.g. on its roof, and includes a pair of antennas 130 connected to a GNSS receiver 132. The GNSS receiver 132 disclosed herein can be adapted for various satellite navigational systems, and can utilize a variety of satellite based augmentation systems (SBAS). Technology is also available for continuing operation through satellite signal interruptions, and can be utilized with the system 2. The antennas 130 can be horizontally aligned transversely with respect to a direction of travel of the tractor 106, i.e. parallel to its X axis. The relative positions of the antennas 130 with respect to each other can thus be processed for determining yaw, i.e. rotation with respect to the vertical Z axis. The sensor 128 also includes a direction sensor 134 and inertial sensors 136, 138 and 140 for detecting and measuring inertial movement with respect to the X, Y and Z axes corresponding to yaw, roll and pitch movements in six degrees of freedom. Signals from the receiver 132 and the sensors 134, 136, 138 and 140 are received and processed by the microprocessor 112 based on how the system 2 is configured and programmed.

The implement (working component) 108 can optionally be equipped with an implement GNSS receiver 146 connected to an implement microprocessor 148 for steering the implement 108 independently of the tractor 106 via an implement steer subsystem 150. An optional articulated connection 110 can be provided between the tractor 106 and the implement 108. Examples of such an articulated connection and an implement steering system are described in U.S. Pat. No. 6,865,465 and U.S. Pat. No. 7,162,348, which are incorporated herein by reference. The implement 108 can comprise any of a wide range of suitable implements, such as planting, cultivating, harvesting and spraying equipment. For example, spraying applications are commonly performed with a boom 152, which can be equipped for automatic, selective control of multiple nozzles 154 and other boom operating characteristics, such as height, material dispensed, etc. Automatic boom control 156 can be utilized, for example, to selectively activate and deactivate individual spray nozzles 154 whereby overspraying previously treated areas can be avoided by the system 2 keeping track of previously treated areas and turning off the nozzles 154 when those areas are reached in an overlapping swath situation, which occasionally occurs in connection with irregularly shaped parcels, near field boundaries and in other operating situations.

It is to be understood that the invention can be embodied in various forms, and is not to be limited to the examples discussed above.

The invention claimed is:

1. A global navigation satellite system (GNSS) based communication system utilizing position-specific information, which communication system includes:
   a fixed-position base station including a base GNSS receiver;
   a rover vehicle;
   a rover GNSS receiver mounted on said vehicle;
   multiple GNSS antennas mounted on said vehicle in fixed, spaced relation and connected to said GNSS receiver;
   a data server associated with said vehicle and receiving input from said base station and said rover GNSS receiver;
   said data server being adapted to associate position-specific information with a GNSS-defined position of said vehicle in real-time;
   said position-specific information corresponding to paths traveled by said vehicle and input to a mapping service via the Internet; and
   said position-specific information being forward-predicted based on vehicle: 1) position; 2) heading determined by the positions of said GNSS antennas relative to each other and said vehicle; and 3) speed determined from the GNSS positions of said vehicle and periodically updated based on an actual course for aerial or ground-based operations corresponding to a predictive vehicle course.

2. The communication system according to claim 1, which includes:
   a radio frequency (RF) communication link between said base and rover GNSS receivers, said link being adapted for transmitting differential GNSS corrections from said base station GNSS receiver to said rover GNSS receiver.

3. The communication system according to claim 1, which includes:
   said base station, said vehicle and said data server being interconnected via the Internet.

4. The communication system according to claim 3, which includes:
   GNSS-defined position-specific information on said data server and comprising one or more of mapping information, images and audio content.

5. The communication system according to claim 4, which includes:
   a personal mobile navigation system including a GNSS receiver connected to the data server and connected to the base station via the Internet; and
   said vehicle and said personal mobile navigation system providing GNSS-defined, location-specific information to said data server and to said base station via the Internet.

6. The communication system according to claim 5, which includes:
   said location-specific information including a geo-reference comprising location-stamped and time-stamped video images associated with respective GNSS-defined locations.

7. The communication system according to claim 6 wherein said location-specific information comprises specific waypoints in audio and video formats.

8. The communication system according to claim 1 wherein said location-specific information corresponds to paths traveled by said vehicle and input to a mapping service via the Internet.

9. The communication system according to claim 1, which includes:
   said location-specific information including an area of agricultural operation divided by a grid into multiple sectors and including reference corners and a scale of XY ranges.

10. The communication system according to claim 9, which includes:
    said vehicle comprising a crop duster aircraft;
    a flight path for said aircraft calculated by said communication system; and
    a distribution pattern for applied materials comprising fertilizer, herbicide or pesticide based on GNSS-defined locations and information received by the aircraft from the base station via the Internet.

11. The communication system according to claim 10, which includes:
    means for monitoring actual flight paths of multiple aircraft in real-time;
    means for displaying to ground-based controllers and airborne pilots said actual flight paths of multiple aircraft in real-time;
    displays in the base station and the aircraft graphically showing treated areas and untreated areas in said agricultural area; and
    means for documenting the agricultural area treatment operation.

12. The communication system according to claim 11, which includes:
    said communication system being programmed to automatically compute and select a best-fit solution for an agricultural operation on said area using auto-select functions for starting corners, scale, grid location, grid spacing, XY ranges and equipment parameters including speed, turning radius, swath width; treatment area configurations, materials being applied, ambient conditions and data from previous agricultural operations.

13. A GNSS-based communication system for a vehicle comprising a tractor and an implement connected to the tractor, which communication system includes:
    a fixed-position base station including a base GNSS receiver;
    a rover GNSS receiver mounted on the tractor;
    a data server linked to said base station via a network;
    a microprocessor on said tractor connected to said rover GNSS receiver and linked to said data server;
    said data server providing geo-reference guidance information to said microprocessor;
    a graphical user interface (GUI)/display mounted on said tractor and connected to said microprocessor;
    a hydraulic autosteer system mounted on said tractor and connected to said microprocessor, said microprocessor providing steering commands to said autosteer system;
    a pair of antennas mounted on said tractor and connected to said rover GNSS receiver whereby said rover GNSS receiver and said microprocessor are adapted for providing a position solution for said vehicle including a geo-reference position and heading;
    a direction sensor connected to said vehicle microprocessor and adapted for providing input thereto corresponding to a direction of travel for said vehicle;
    inertial sensors mounted on said tractor and connected to said microprocessor, said inertial sensors being adapted for providing input to said microprocessor corresponding to yaw, roll and pitch movements with respect to X, Y and Z axes for said tractor; and said microprocessor using said inertial sensor input in calculating a position solution for said tractor;

said implement including an implement GNSS receiver, an implement GNSS antenna connected to said implement GNSS receiver; an implement autosteer subsystem and an implement microprocessor for providing steering commands to said implement autosteer subsystem;

an articulated connection between the tractor and the implement enabling autosteering the implement independently of the tractor;

said implement comprising a sprayer with a boom and multiple nozzles;

means for independently and selectively controlling the operation of said nozzles based on said location-specific information associated with a travel path of said vehicle and said implement;

said microprocessor storing information corresponding to previously-treated portions of said agricultural area and said microprocessor deactivating selective said nozzles over said previously-treated portions;

GNSS-defined position-specific information on said data server and comprising one or more of mapping information, images and video content;

said location-specific information being forward-predicted based on vehicle: 1) position; 2) heading determined by the positions of said GNSS antennas relative to each other and said vehicle; and 3) speed determined from the GNSS positions of said vehicle periodically updated based on actual course corresponding to predictive vehicle tracks; and said location-specific information including an area of agricultural operation divided by a grid into multiple sectors and including reference corners and a scale of XY ranges.

14. The communication system according to claim 13, which includes:

said implement including an implement GNSS receiver, an implement GNSS antenna connected to said implement GNSS receiver; an implement autosteer subsystem and an implement microprocessor for providing steering commands to said implement autosteer subsystem; and an articulated connection between the tractor and the implement enabling autosteering the implement independently of the tractor.

15. The communication system according to claim 14, which includes:

said implement comprising a sprayer with a boom and multiple nozzles; and means for independently and selectively controlling the operation of said nozzles based on said location-specific information associated with a travel path of said vehicle and said implement; and said microprocessor storing information corresponding to previously-treated portions of said agricultural area and said microprocessor deactivating selective said nozzles over said previously-treated portions.

16. The communication system according to claim 13, which includes:

GNSS-defined position-specific information on said data server and comprising one or more of mapping information, images and video content;

said location-specific information being forward-predicted based on position, heading and speed of said vehicle periodically updated based on actual course corresponding to predictive vehicle tracks; and said location-specific information including an area of agricultural operation divided by a grid into multiple sectors and including reference corners and a scale of XY ranges.

17. A method of GNSS-based mobile communication, which comprises the steps of:

providing a fixed-position base station including a base GNSS receiver;

providing a rover vehicle with a microprocessor;

mounting a rover GNSS receiver on said rover vehicle and connecting said rover GNSS receiver to said microprocessor;

providing multiple GNSS antennas;

mounting said antennas in predetermined spaced relation on said vehicle;

connecting said antennas to said GNSS receiver;

providing a data server;

linking said base station with said data server via a network;

linking said data server with said vehicle microprocessor;

generating GNSS-based positioning information with said base station and transmitting same to said data server via said network;

loading clips comprising pre-recorded audio, visual, audiovisual or utility-generated information on said data server;

associating said clips with GNSS-defined positions;

acquiring GNSS ranging signals with said base station GNSS receiver and said rover GNSS receiver;

computing GNSS-defined position solutions for said vehicle with said microprocessor using said GNSS ranging signals acquired by said base station and rover receivers;

determining with said microprocessor if said vehicle is in proximity to a respective GNSS-defined position associated with a respective clip;

if said vehicle is in proximity to a respective GNSS-defined position associated with a respective clip, transmitting said clip to said vehicle;

playing a respective clip in response to said proximity determination; and annotating a waypoint along a travel path of said vehicle with said clip;

an operator of said vehicle generating said clips at GNSS-defined locations of said vehicle; and loading said operator-generated clips on said data server; and said position-specific information being forward-predicted based on vehicle: 1) position; 2) heading determined by the positions of said GNSS antennas relative to each other and said vehicle; and 3) speed determined from the GNSS positions of said vehicle and periodically updated based on an actual course for aerial or ground-based operations corresponding to a predictive vehicle course.

18. A storage medium encoded with a machine-readable computer program code, the code including instructions for causing a computer to implement a method of GNSS-based mobile communication, which method comprises the steps of:

providing a fixed-position base station including a base GNSS receiver;

providing a rover vehicle with a microprocessor;

mounting a rover GNSS receiver on said rover vehicle and connecting said rover GNSS receiver to said microprocessor;

providing multiple GNSS antennas;

mounting said antennas in predetermined spaced relation on said vehicle;
connecting said antennas to said GNSS receiver;
providing a data server;
providing a data server;
linking said base station with said data server via a network;
linking said data server with said vehicle microprocessor;
generating GNSS-based positioning information with said base station and transmitting same to said data server via said network;
loading clips comprising pre-recorded audio, visual, audiovisual or utility-generated information on said data server;
associating said clips with GNSS-defined positions;
acquiring GNSS ranging signals with said base station GNSS receiver and said rover GNSS receiver;
computing GNSS-defined position solutions for said vehicle with said microprocessor using said GNSS ranging signals acquired by said base station and rover receivers;
determining with said microprocessor if said vehicle is in proximity to a respective GNSS-defined position associated with a respective clip;
if said vehicle is in proximity to a respective GNSS-defined position associated with a respective clip, transmitting said clip to said vehicle;
playing a respective clip in response to said proximity determination;
annotating a waypoint along a travel path of said vehicle with said clip; and
said position-specific information being forward-predicted based on vehicle: 1) position; 2) heading determined by the positions of said GNSS antennas relative to each other and said vehicle; and 3) speed determined from the GNSS positions of said vehicle and periodically updated based on an actual course for aerial or ground-based operations corresponding to a predictive vehicle course.

19. A global navigation satellite system (GNSS) based communication system utilizing position-specific information for a crop duster aircraft, which communication system includes:
 a fixed-position base station including a base GNSS receiver;
 a rover GNSS receiver mounted on the aircraft;
 a data server associated with the aircraft and receiving input from said base station and said rover GNSS receiver;
 said data server being adapted to associate position-specific information with a GNSS-defined position of the aircraft in real-time;
 said location-specific information including an area of agricultural operation divided by a grid into multiple sectors and including reference corners and a scale of XY ranges;
 a flight path for said aircraft calculated by said communication system;
 a distribution pattern for applied materials comprising fertilizer, herbicide or pesticide based on GNSS-defined locations and information received by the aircraft from the base station via the Internet;
 means for monitoring actual flight paths of multiple aircraft in real-time;
 means for displaying to ground-based controllers and airborne pilots said actual flight paths of multiple aircraft in real-time;
 displays in the base station and the aircraft graphically showing treated areas and untreated areas in said agricultural area;
 means for documenting the agricultural area treatment operation; and
 said communication system being programmed to automatically compute and select a best-fit solution for an agricultural operation on said area using auto-select functions for starting corners, scale, grid location, grid spacing, XY ranges and equipment parameters including speed, turning radius, swath width; treatment area configurations, materials being applied, ambient conditions and data from previous agricultural operations; and
 said position-specific information being forward-predicted based on vehicle: 1) position; 2) heading determined by the positions of said GNSS antennas relative to each other and said vehicle; and 3) speed determined from the GNSS positions of said vehicle and periodically updated based on an actual course for aerial or ground-based operations corresponding to a predictive vehicle course.

* * * * *